Sept. 24, 1963    J. MARTIN    3,104,439
COUPLINGS

Filed Sept. 20, 1960    3 Sheets-Sheet 1

Inventor
JAMES MARTIN
By [signature]
AGENT

Sept. 24, 1963   J. MARTIN   3,104,439
COUPLINGS
Filed Sept. 20, 1960   3 Sheets-Sheet 2
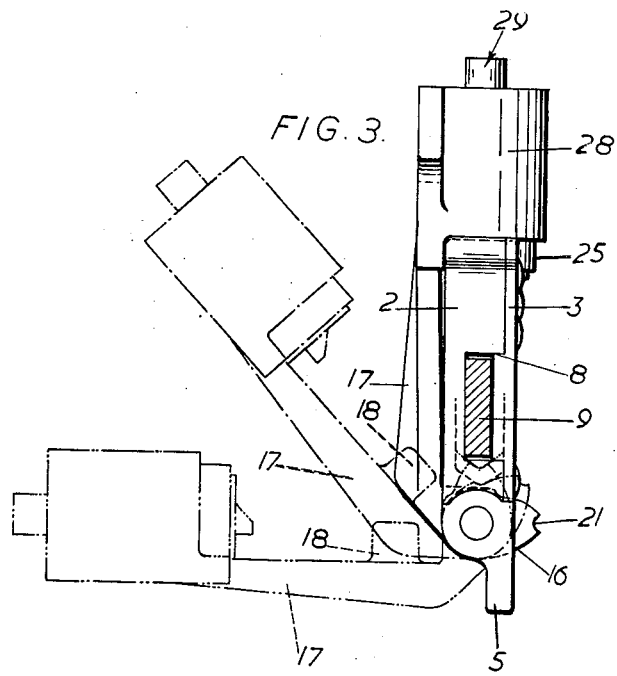
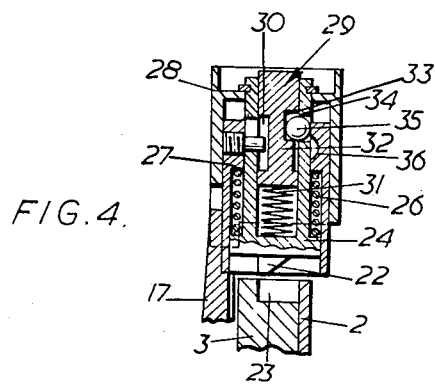
*Inventor*
JAMES MARTIN
By
AGENT

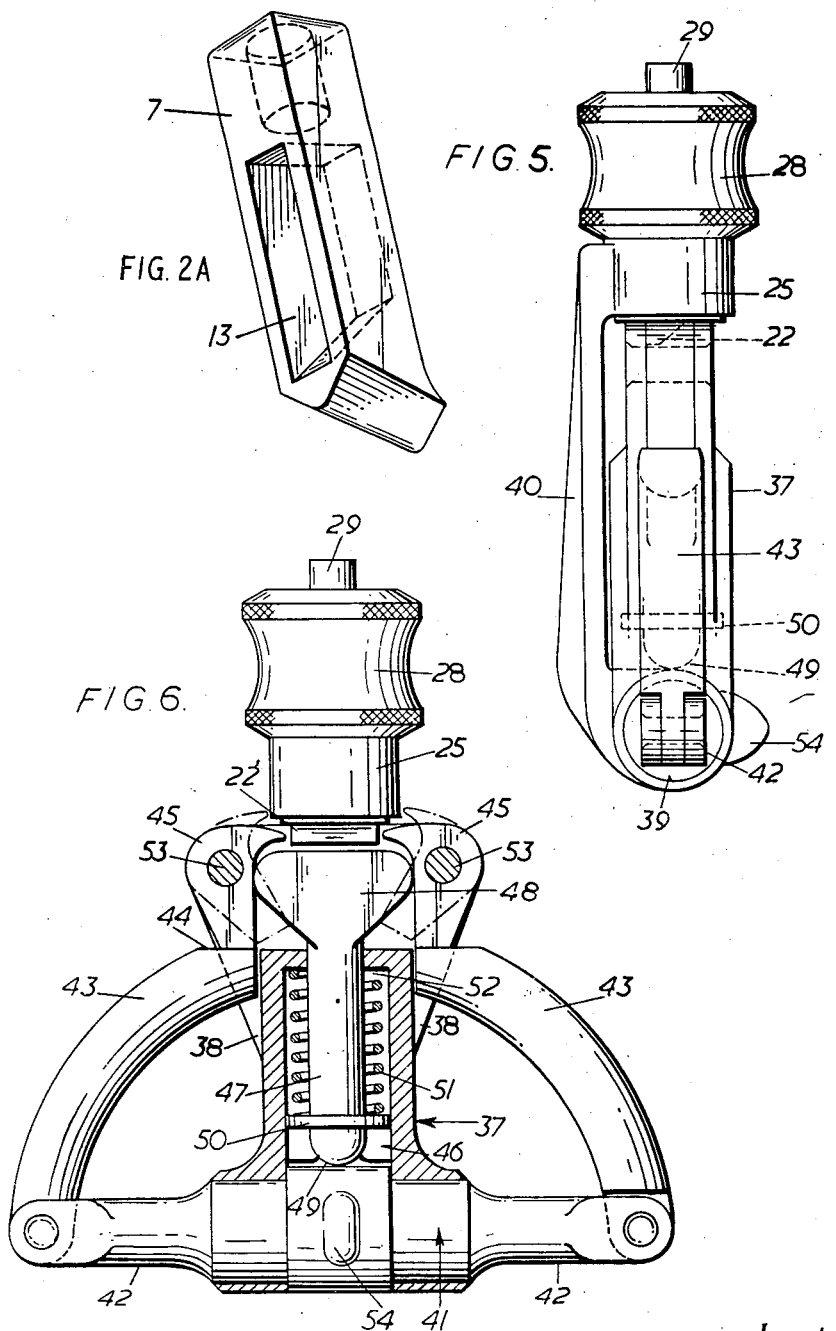

United States Patent Office 3,104,439
Patented Sept. 24, 1963

3,104,439
COUPLINGS
James Martin, Southlands Manor, Southlands Road,
Denham, near Uxbridge, England
Filed Sept. 20, 1960, Ser. No. 57,358
5 Claims. (Cl. 24—205.17)

This invention concerns improvements in or relating to quickly releasable couplings for connecting elements such as flexible straps, webbings, cables and the like, and is especially applicable to couplings for connecting the flexible webbings, straps, and the like (all hereinafter called "connectible elements") of parachute, seat or like harness used by airmen.

Many types of quick release boxes and other couplings for the connectible elements of airmen's harnesses are known and each have their own advantages and disadvantages. Most of such devices at present being used have two major defects, the first being that it is possible to produce premature unlocking of these devices by the application of accelerations of no very great magnitude and the second being that the devices are rather bulky and cumbersome.

It will be apparent that the first mentioned defect is of serious concern to those using or authorizing the use of these devices where accelerations of substantial magnitude are likely to be encountered as, for example, in connection with an aircraft ejection seat. With such seats accelerations and decelerations of quite considerable magnitude are likely to be encountered during and after ejection of the seat and it is therefore an object of this invention to provide a quickly releasable coupling, and particularly one for use with parachute harness, seat harness and the like in connection with aircraft ejection seats, and of which the means for locking the connectible elements to the coupling means is less susceptible than hitherto to unintentional release as a result of acceleration and deceleration.

A further object of the invention is to provide a quickly releasable coupling of relatively compact construction.

A further object of the invention is to enable the release of the connectible elements from the quickly releasable coupling to be effected rapidly by one-handed operation.

According to this invention there is provided a releasable coupling for connecting together interconnectible elements, comprising a body part; anchorage means on said body part for the reception of at least one of said elements, such anchorage means being movable relatively to said body part to release said elements when desired; locking means associated with said body part for co-operation with said anchorage means to lock the latter in an element retaining position, but movable to an anchorage means releasing position; and at least two manually operable members for retaining said locking means in its anchorage means locking position, such manually operable members requiring sequential movement in substantially opposite directions to effect the release of said locking means.

In order that the nature of the invention may be more readily understood, two embodiments of the same will now be described by way of example and with reference to the accompanying drawings in which:

FIGURE 2A shows a detail of the apparatus of FIG. 1 in a perspective view;

FIGURE 3 is a section on the line III—III of FIGURE 1 and also shows (in dot-and-pick) the actuating lever in two of its released positions;

FIGURE 4 is a vertical section through the head of the actuating lever when released from the body of the coupling;

FIGURE 5 is a rear elevation, partly in section, of a second embodiment of a coupling according to the invention; and FIGURE 6 is a side elevation of the coupling illustrated in FIGURE 5.

Figure 1:
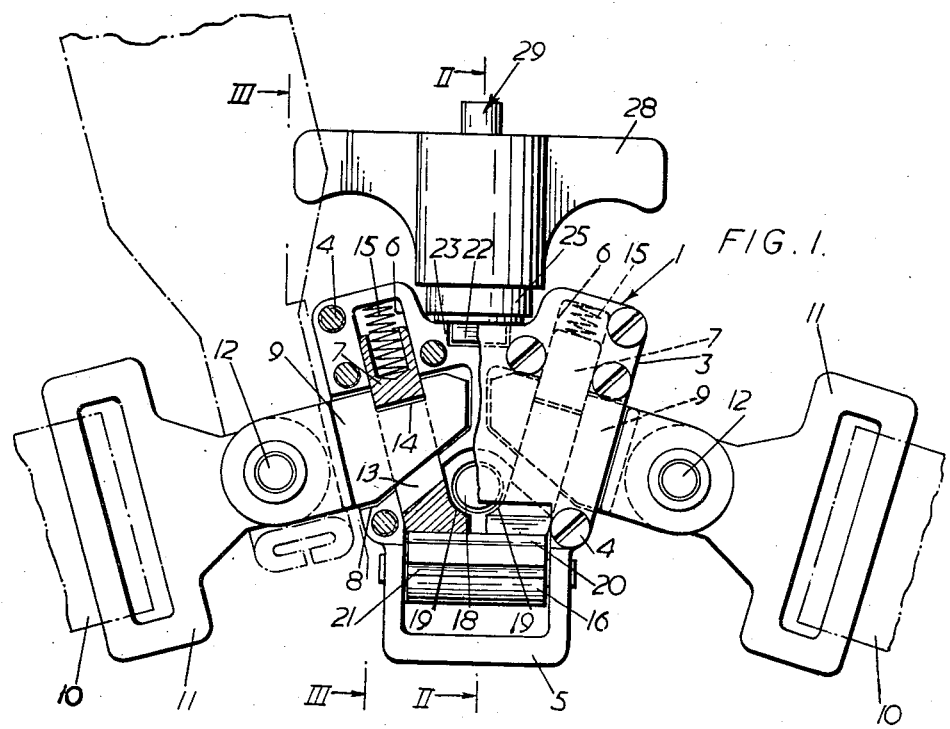
FIGURE 1 is a rear elevation, partly in section, of a first embodiment of a coupling according to the invention, and shows a pair of connecting elements engaged with the coupling.

In the embodiment of the invention illustrated in FIGURES 1 to 4 of the drawings, the coupling comprises a housing 1 including a front casing part 2 and a rear closure plate 3 secured together by means of bolts 4. The lower part of the casing 2 extends downwardly beyond the bottom edge of the closure plate 3, and defines a loop 5 by means of which the coupling may be secured to a webbing strap forming part of the airman's seat harness; this loop 5 is particularly intended for the reception of the forward end of an "anti-G" or holding-down strap, for example of the kind described in my co-pending British patent application No. 12,299/60.

The casing part 2 of the coupling defines within itself a pair of channels 6 in each of which is slidably mounted an anchorage or link member in the form of a plunger 7. Situated transversely of the channels 6, one at each side of the housing 1, are openings 8 for the reception of tapered lugs 9, the latter being secured to the ends of connectible members 10 by means of loop elements 11 pivoted as at 12 to the wider ends of the lugs 9.

The front to rear depth of each of the openings 8 is substantially less than that of the channel 6 which extends transversely across it, and the plungers 7 housed in such channels are rebated at 13, substantially medially of their lengths, for the reception of the lugs 9, the latter members being formed with slots 14 in which the parts of the plungers 7 immediately above the rebates therein are adapted to engage (as shown in FIGURE 1) so as to retain the lugs 9 against withdrawal.

The plungers 7 are continually urged towards their lug retaining positions by compression springs 15 acting between the upper end walls of the channels 6 and the adjacent upper extremities of the plungers 7.

Figure 2:
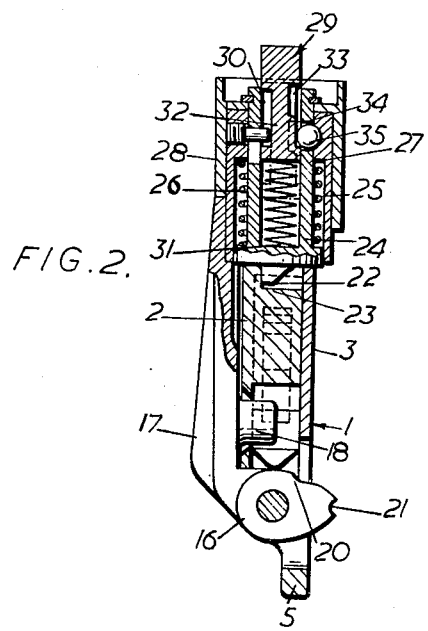
FIGURE 2 is a section on the line II—II of FIGURE 1.

As may be seen from FIGURE 1, the plungers 7 converge towards one another in a downward direction and at their lower ends are arranged to co-operate with a cam member 16 pivotally mounted between the side arms of the loop 5 formed at the lower end of the housing. As may clearly be seen in FIGURES 2 and 3, the cam 16 is substantially egg-shaped in vertical cross-section and acts, when rotated in an anti-clockwise direction as seen in FIGURES 2 and 3, to raise the plungers 7 against the action of the compression springs 15 until, when the cam has been rotated through 90° from its position as shown in FIGURE 2, the plungers 7 are completely disengaged from the lugs 9, which may then be withdrawn from the housing 1.

For operating the cam 16 an actuating arm or lever 17 is formed integrally therewith and is swingable through approximately 90° (as shown in FIGURE 3) between a locking position in which it lies adjacent the housing 1 and releasing position in which, as described above, the plungers 7 are raised out of engagement with the lugs 9.

For locking the plungers 7 positively against upward lug releasing movement when the actuating lever 17 is in its locking position, the latter is furnished with a locking stud 18 adapted to engage with inturned base portions 19 of the plungers 7, as best seen in FIGURE 1, so as to lock the plungers in their connecting element retaining positions. It is thus possible to free the plungers 7 for upward movement in their channels 6 by swinging the actuating lever 17 outwardly through a relatively small angle, and the lugs 9 are bevelled at their inner ends so that, when the plungers are so freed, the lugs 9 may be pressed into their locked positions in the housing 1 without first raising the plungers by means of the cam 16. For this purpose the cam is formed with a rebate 20 so that it, and its associated actuating lever 17, are capable of occupying an intermediate position (shown in FIGURE 3) in which the lugs 9 may be inserted into their locked positions in the housing but not withdrawn therefrom until the actuating lever 17 is swung outwardly to its full extent so as to raise the plungers 7 and thus free the lugs 9 for withdrawal.

The cam 16 is formed with a groove 21 at its narrower end for engagement with the pointed lower ends of the plungers 7 when the actuating lever is in its lug releasing position shown on the left of FIGURE 3, so as to retain the cam and actuating lever against undesired movement out of such position.

For the purpose of retaining or locking the actuating lever 17 alongside the housing 1 with the stud 18 retaining the plungers 7 against upward movement, a spring loaded latch 22 is provided which engages in a slot 23 in the housing 1. The latch 22 is carried at the lower end of a plunger 24 slidably mounted in an upstanding cylindrical tubular boss 25 provided on the upper end of the actuating lever 17 and so disposed that, when the actuating lever is in its locking position side-by-side with the housing, the boss 25 will be coaxial with the said housing. The latch plunger 24 is urged downwardly towards the housing 1 of the coupling by means of a compression spring 26 surrounding the plunger 24 and arranged between a peripheral flange on the lower part of the plunger and an annular shoulder 27 within the upper part of the tubular boss 25.

Surrounding the tubular boss 25 is an axially bored winged knob 28 slidable on the boss 25 and fixed at its upper part to the upper end of the latch plunger 24 so that by pulling the knob 28 upwardly along the tubular boss 25 the latch nose 22 can be disengaged from the slot 23 in the housing of the body of the coupling, so as to release the upper end of the actuating lever 17 from the latter.

However, in order to avoid accidental unlocking movement of the latch plunger 24 due to accelerations or decelerations to which the coupling may be subjected in use, locking means are provided for preventing unintentional axial movement of the latch plunger relatively to the tubular boss 25 of the actuating lever 17. This locking means comprises a push button 29 mounted for axial sliding movement in an axial bore 30 of the latch plunger 24, the upper end of the push button 29 projecting upwardly beyond the upper end of the latch plunger 24 and being urged upwardly with respect to the latter by a compression spring 31 located between the lower end of the push button and the base of the axial bore 30 in the latch plunger 24.

Within the latch plunger 24, and between its ends, the push button 29 is twice reduced in diameter so as to form an intermediate shank 32 furnished at its upper part with a circumferential groove 33.

In the peripheral wall of the latch plunger 24 is formed a radial hole 34 and in this hole is located a locking ball 35 which can be moved radially inwardly or outwardly to a limited extent with respect to the latch plunger 24, the ball 35 being capable of engaging in an annular groove 36 in the inner surface of the tubular boss 25 of the actuating lever 17 and being adapted normally to be retained in this locking position by the engagement of its inner portion with the periphery of the shank 32 of the push button 29 in order to lock the latch plunger 24 against axial movement with respect to the said tubular boss 25, the ball 35 being released for inward movement (to free the latch plunger 24 for axial movement relatively to the tubular boss 25) by depressing the push button 29 and so registering the annular groove 33 in the shank of the push button with the ball 35 so that the latter may move inwardly entirely within the outer periphery of the latch plunger 24. This freeing of the locking ball 35 for inward movement is accomplished by an axial depression of the push button 29, whilst disengagement of the latch 22 from the slot 23 in the housing to free the actuating lever 17 requires a raising of the latch plunger 24 with respect to the tubular boss 25 of the actuating lever, the movement of the push button 29 and latch plunger 24 thus being in exactly opposite directions and requiring to be made sequentially, i.e. the push button must first be depressed before the latch plunger can be raised.

Thus a double lock is applied to the actuating lever 17 in its closed or locked position. By thus arranging to effect unlocking of the plungers 7 by the movement of at least two parts in opposed directions the liability of the coupling being accidentally released due to the coupling being subjected to accelerations or decelerations is eliminated or very greatly reduced.

In the embodiment of the invention shown in FIGURES 5 and 6 the coupling comprises a centrally disposed housing 37 having, at its upper end, a pair of parallel spaced lugs 38 projecting upwardly and laterally beyond the upper end and perimeter respectively of the housing 37, and having, at its lower end, a transverse bore 39 with a centrally disposed cutaway for the end of an actuating lever 40 which pivots freely on a horizontal member 41 fitted in said transverse bore and retained in the latter by pins or other suitable means, the said horizontal member projecting outwardly beyond the said housing on two sides thereof and constituting a pair of arms 42 perpendicular to the axis of the housing 37, the outer ends of these arms being bifurcated and each having pivoted in such bifurcated end the lower end of one of a pair of arcuate anchorage members or links 43 mainly of approximately circular cross-sectional form and located in a common plane.

The anchorage members or links 43 are approximately of convex or quadrantal form and have their free ends furnished with flats 44 on the side and top faces thereof so that these free ends will pass between the corresponding portions of the laterally extending lugs 38 on the upper end of the housing 37 for co-operation with locking catches or pawls 45 carried by these lugs 38 and subsequently described.

The housing 37 has a vertical centrally disposed bore 46 perpendicular to the axis of rotation of the actuating lever 40 and within this bore is located for free sliding movement a plunger 47 having its upper end disposed beyond the upper end of the housing 37 and between the laterally spaced parallel lugs 38 and furnished with a transverse head 48 constituting a catch or pawl operating cam. The plunger 47 is thus of approximately T-shape. At its lower end the plunger 47 has a hemispherical tip 49 depending from a peripheral flange 50 and against the upper surface of this flange engages the lower end of a compression spring 51 surrounding the plunger 47 and having its upper end engaging against an internal shoulder 52 at the upper end of the housing 37 so as to urge the plunger 47 downwardly with respect to the housing.

Between the parallel lugs 38 are mounted, as hereinbefore mentioned, a pair of locking catches or pawls 45, these each being in the form of a small bell crank lever and pivoted upon a separate pivot pin 53 extending between the pair of lugs 38 perpendicular to the plane in which the anchorage or link members 43 are adapted to swing, i.e. parallel to the pivoting axes of these members.

One of the arms of each of the bell crank levers 45 extends downwardly from the pivot 53 towards the upper end of the housing 37 whilst the other arm of the lever projects inwardly from the pivot towards the similar arm of the other bell crank lever and the cam head 48 of the T-shaped plunger 47 is located closely between the dependent arms of the two bell crank levers 45 with one end lying in the angle of each of such levers, these ends of the cam head 48 being of rounded or semi-cylindrical form so as to co-operate with the levers 45 in order to move them to or from their locking positions according to whether the plunger 47 is being moved downwardly by its spring 51 with respect to the housing 37 or upwardly by means of a radial cam projection 54 on the pivoted end of the actuating lever 40 as this is swung from a position herein referred to as its locking position in which it lies alongside the housing 37 to a release position at substantially 90° from its locking position in which the lever 40 projects forwardly away from the housing 37 and perpendicularly to the arms 42.

Thus the spring 51 on the plunger 47 always tends to move the latter downwardly in order to pivot the bell crank levers 45 in such a direction that their lower ends move outwardly to engage the upper surfaces of the upper ends of the anchorage or link members 43 when these ends are located between the lugs 38 on the housing 37, thereby to lock such ends against upward and outward movement relative to the housing, whilst movement of the plunger 47 in the opposite direction as a result of swinging the actuating lever 40 from its locked to its released position causes the head of the plunger to urge the inwardly directed arms of the bell crank levers 45 upwardly and the lower ends of the dependent arms of these levers inwardly to release the said anchorage or link members.

In this embodiment of the invention, the arrangement for locking the actuating lever 40 in contact with the housing 37 is precisely similar to that illustrated in FIGURES 1 to 4 (and particularly in FIGURES 2 and 4) and will not, therefore, be described in detail.

It will be seen that with the actuating lever 40 locked in its vertical or closed position adjacent to the housing 37 of the body of the coupling and with the latch member 22 engaged with the top of the housing, a positive locking of the anchorage or link members 43 is achieved by the bell crank levers 45 and these are prevented from rotation about their pivots 53 by the engagement therewith of the cam head 48 of the T-shaped plunger 47 which in turn is prevented from downward movement by engagement of its hemispherical end 49 with the pivoted end of the actuating lever 40 and is prevented from upward releasing movement by means of the latch 22 which, in the locked position of the coupling, engages or lies closely adjacent the upper end of the head 48 of the plunger 47 and is itself locked against accidental release movement by means of the push button 29 and locking ball 35 (not visible).

A coupling constructed as shown in FIGURES 5 and 6 is particularly suitable for attaching together or to other equipment parachute of like harness members terminating in spring hooks adapted to be snapped on to the anchorage or link members 43 of the coupling and for quick release in emergency, but for ordinary manual disengagement in normal circumstances, it only being necessary to operate the actuating lever 49 for the release of the said interconnected members in the event of an emergency arising, e.g. when an ejection seat is launched from an aircraft.

When in use by an airman, a coupling according to either of the embodiments described will normally lie in front of the airman's abdomen with the actuating lever 17 or 40 at the front of the coupling, so that it will be a forward and downward movement of the actuating lever which will be needed to effect the release of the anchorage or link members 7 or 42.

I claim:
1. A releasable coupling for connecting elements of an airman's harness and the like, comprising, in combination,
 (a) a body part;
 (b) an anchorage member carried by said body part for attaching one of said elements thereto, said anchorage member being movable relative to said body part between an element retaining position and an element releasing position;
 (c) anchorage member locking means engageable with said anchorage member for securing the same in said element retaining position thereof;
 (d) a manually operable actuating lever pivotally attached to said body part for movement between a first position adjacent said body part, and a second position remote from said body part;
 (e) cam means on said lever and engageable with said anchorage member for actuating release of said anchorage member from said element retaining position when said lever moves from said first to said second position thereof;
 (f) a manually releasable latch on said lever and movable thereon toward and away from a retaining position in which said latch engages said body part for retaining said lever in said first position thereof;
 (g) spring means permanently urging said latch to move on said lever in a predetermined direction into said retaining position thereof;
 (h) a latch locking member on said lever movable toward and away from a locking position in which said latch locking member secures said latch against movement away from said retaining position thereof;
 (i) a digitally operable plunger member on said lever and operatively connected to said latch locking member for controlling movement thereof; and
 (j) spring means urging said plunger to move on said lever in a direction opposite to said predetermined direction toward a position in which said plunger member retains said latch locking member in said locking position thereof,
whereby movement of said anchorage member from said element retaining position to said element releasing position requires sequential manual movement of said plunger member, said latch, and said lever in different directions.

2. A coupling as claimed in claim 1, wherein said cam means has a face formed with a groove, a portion of said anchorage member engaging said groove when said lever is in a position intermediate said first and second positions, said anchorage member locking means is out of engagement with said anchorage member, and said anchorage member is in said element retaining position thereof.

3. A coupling as claimed in claim 1, wherein said cam means has a face formed with a groove, a portion of said anchorage member engaging said groove when said lever is in said second position thereof for securing the lever in said second position.

4. A releasable coupling for connecting together interconnectable elements comprising a body part, anchorage means on said body part for the reception of at least one of said elements, such anchorage means comprising at least one plunger slidably mounted in said body part and spring biased towards a position in which it retains at least one of said elements against withdrawal, locking means movable on said body part toward and away from an anchorge means locking position in which said locking means locks said anchorage means in an element retaining position and two manually operable members, one of said members being movable on said body part in a predetermined direction from a first position thereof to a second position, said one member when in said first position thereof retaining said locking means in the anchorage locking position thereof and the other one of said members being movable on said body part in a direction substantially opposite to said predetermined direction from a first position thereof to a second position, said other member when in said first position thereof retaining said one member in the first position of the latter, and including manually operable actuating means for controlling the movement of said locking means between its anchorage means locking position and its anchorage means releasing position; a cam surface on said actuating means for effecting the movement of said anchorage means to its element releasing position subsequent to the release of said locking means, said actuating means includes a manually operable elongated lever having two end portions, one of said end portions being pivoted to said body part, one of said two members being a manually releasable latch on the other end portion of said lever and longitudinally movable thereon into a position of engagement with said body part for retaining said lever in a position adjacent said body part; said coupling further comprising spring means for urging said latch to move into said position of engagement, a latch locking member on said lever and movable toward and away from a position in which said latch locking member engages said latch for locking the same in said position of engagement, said other one of said two members being a digitally operable plunger member longitudinally movable on said lever and operatively connected to said latch locking member for moving the same into said position thereof when said plunger member moves in a direction opposite to the direction of movement of said latch into the position of engagement of the latter; and spring means urging said plunger member to move in said opposite direction.

5. A coupling as claimed in claim 4, wherein said latch locking member comprises a ball.

References Cited in the file of this patent

UNITED STATES PATENTS

| | | |
|---|---|---|
| 363,815 | Fisher | May 31, 1887 |
| 1,489,648 | Schmidt | Apr. 8, 1924 |
| 2,171,496 | Waite | Aug. 29, 1939 |

FOREIGN PATENTS

| | | |
|---|---|---|
| 728,533 | France | July 7, 1932 |
| 781,228 | France | May 11, 1935 |
| 799,130 | France | June 6, 1936 |
| 800,862 | France | July 21, 1936 |
| 1,099,122 | France | Aug. 30, 1955 |
| 322,008 | Switzerland | July 15, 1957 |
| 847,174 | Great Britain | Sept. 7, 1960 |